(12) United States Patent
Yoshida et al.

(10) Patent No.: US 6,665,142 B2
(45) Date of Patent: Dec. 16, 2003

(54) THIN FILM MAGNETIC HEAD AND METHOD OF MANUFACTURING THE SAME

(75) Inventors: Makoto Yoshida, Tokyo (JP); Taro Oike, Tokyo (JP); Atsushi Iijima, Tokyo (JP)

(73) Assignee: TDK Corporation, Tokyo (JP)

( * ) Notice: Subject to any disclaimer, the term of this patent is extended or adjusted under 35 U.S.C. 154(b) by 265 days.

(21) Appl. No.: 09/745,530

(22) Filed: Dec. 26, 2000

(65) Prior Publication Data

US 2001/0040762 A1 Nov. 15, 2001

(30) Foreign Application Priority Data

Dec. 27, 1999 (JP) .......................................... 11-369599

(51) Int. Cl.[7] .............................................. G11B 5/147
(52) U.S. Cl. ................................................... 360/123
(58) Field of Search ................................. 360/126, 315, 360/320, 123; 29/603.24

(56) References Cited

U.S. PATENT DOCUMENTS

| | | | | |
|---|---|---|---|---|
| 5,208,716 A | * | 5/1993 | Lazzari ..................... | 360/318.1 |
| 5,654,847 A | * | 8/1997 | Yagi et al. ................ | 360/97.02 |
| 5,936,812 A | * | 8/1999 | Terunuma et al. ........... | 360/317 |
| 5,982,568 A | * | 11/1999 | Yamamoto et al. ........... | 360/31 |
| 6,333,841 B1 | * | 12/2001 | Sasaki ..................... | 360/317 |
| 6,483,662 B1 | * | 11/2002 | Thomas et al. ............. | 360/126 |
| 6,490,126 B1 | * | 12/2002 | Sasaki ..................... | 360/126 |

FOREIGN PATENT DOCUMENTS

JP          A-11-353616         12/1999

* cited by examiner

Primary Examiner—Robert S. Tupper
(74) Attorney, Agent, or Firm—Oliff & Berridge PLC

(57) ABSTRACT

An object of the invention is to provide a thin film magnetic head which can exhibit a high-performance head characteristic without complicating the manufacturing procedure, and a method of manufacturing the same. A coil connection is integrated into one body and constituted part of the thin film coil. A connection middle pattern is provided on the coil connection at the time of forming a pole tip so that the position of the upper surface of the connection middle pattern becomes higher than that of the top pole tip. After the whole portion is covered by an insulating film, the connection middle pattern also can be exposed by polishing the surface of the insulating film until the top pole tip is exposed. Therefore, unlike the case where no connection middle pattern is provided, it is not necessary to have a step of forming an opening by partially removing part of the insulating film. As a result, the number of manufacturing steps can be reduced.

10 Claims, 11 Drawing Sheets

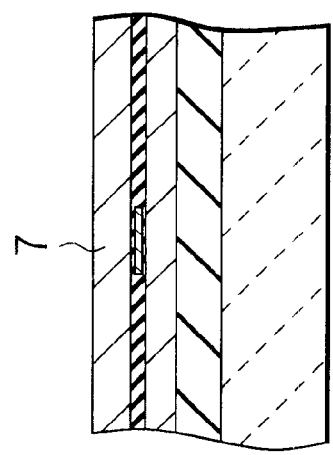
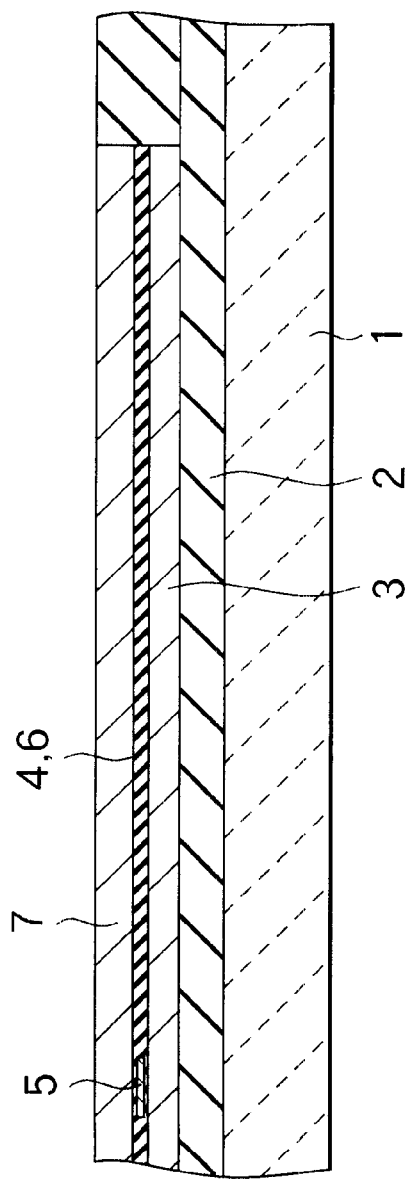

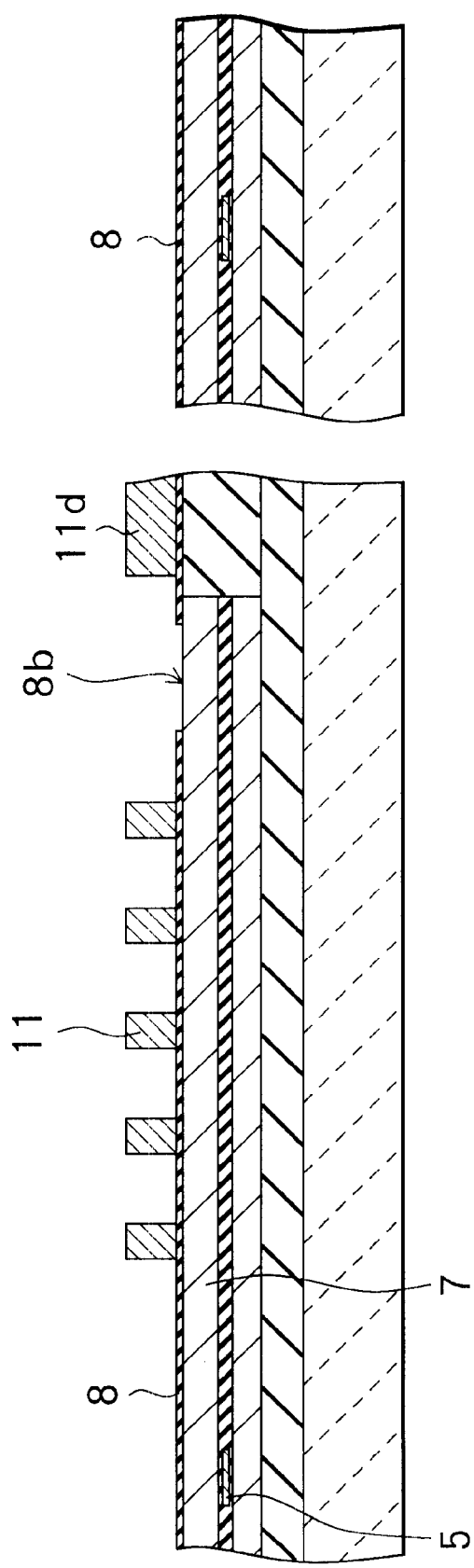

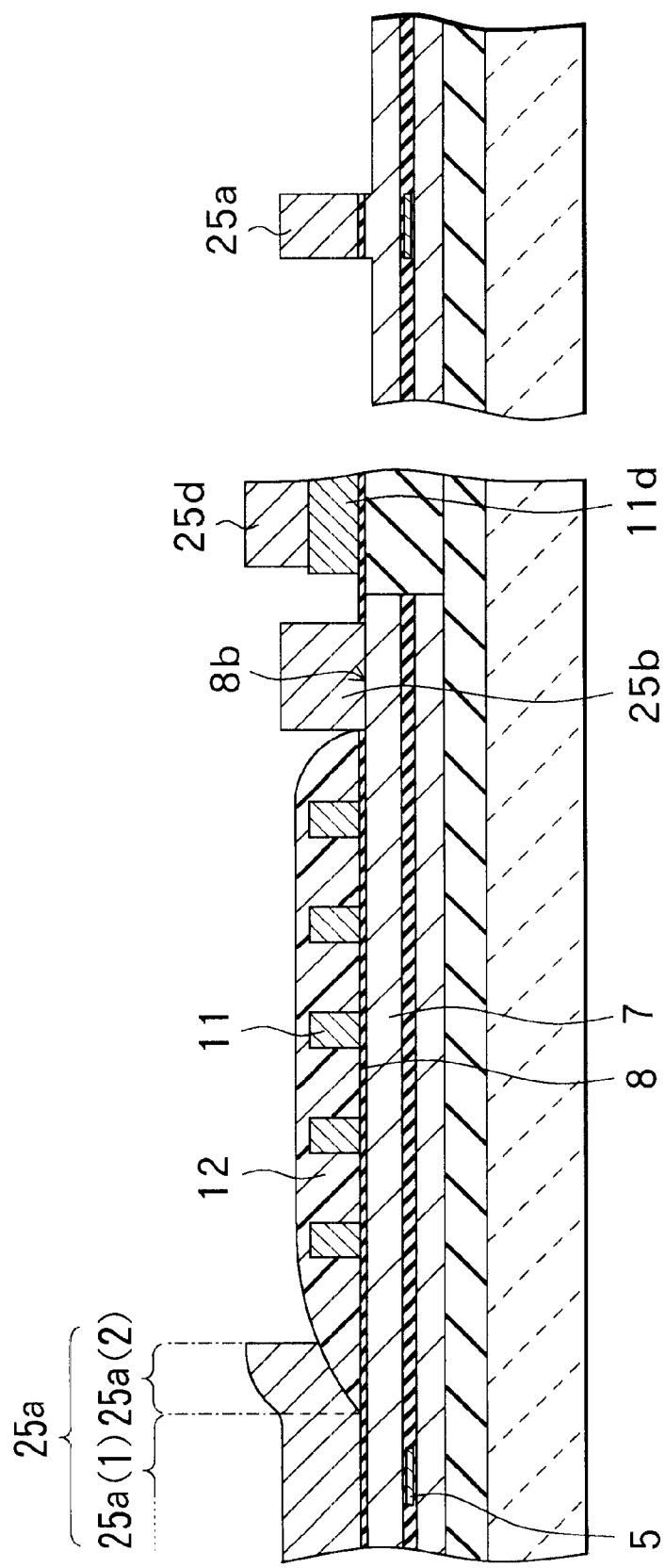

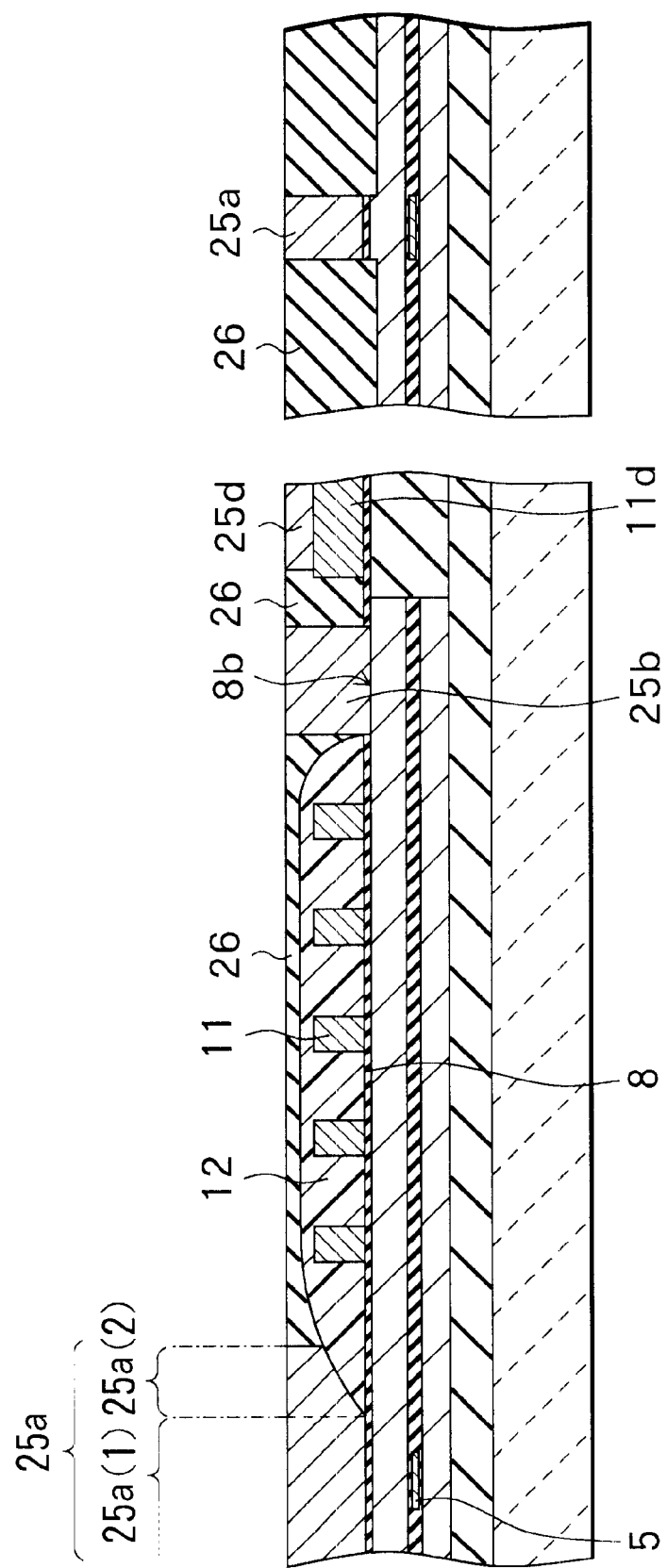

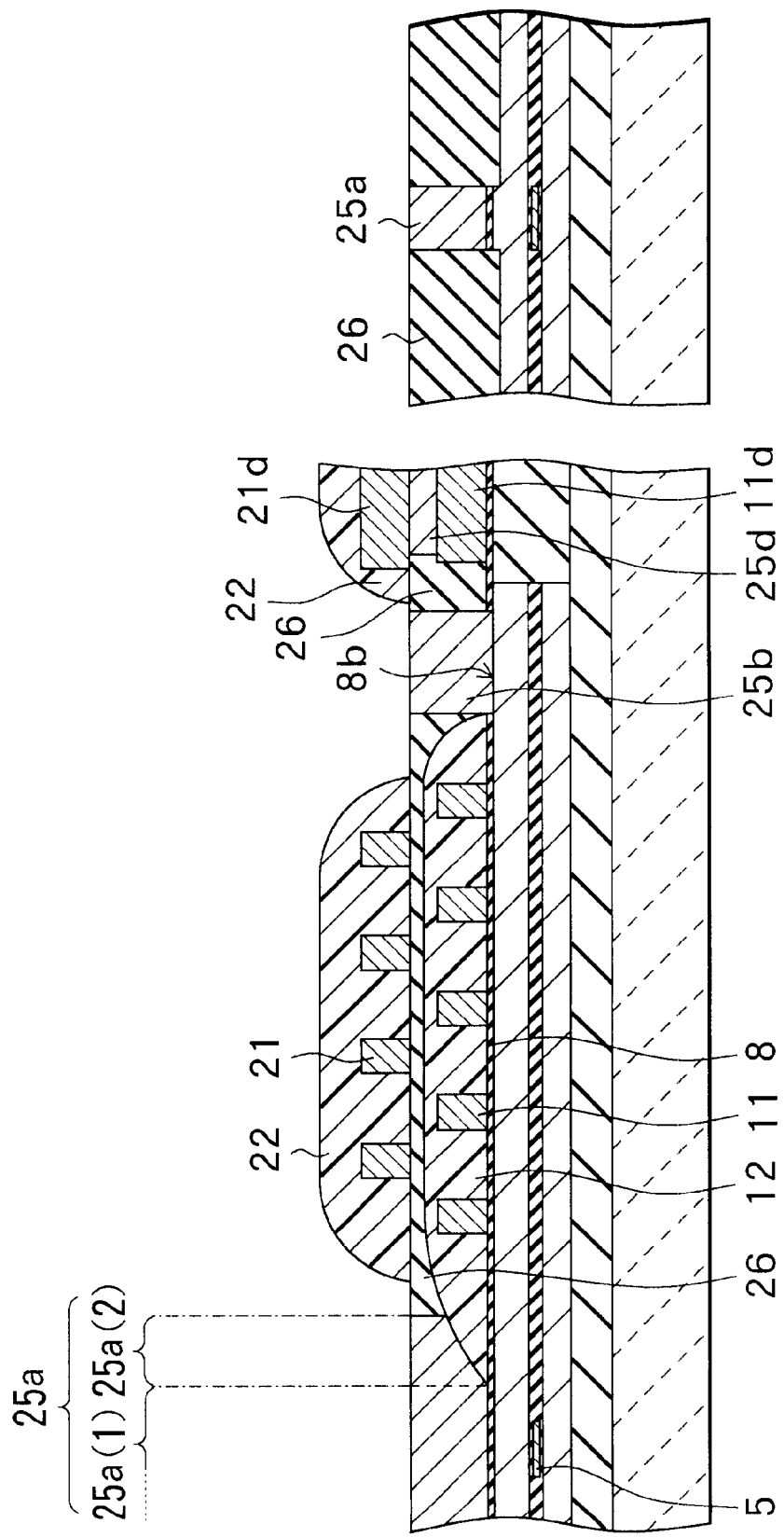

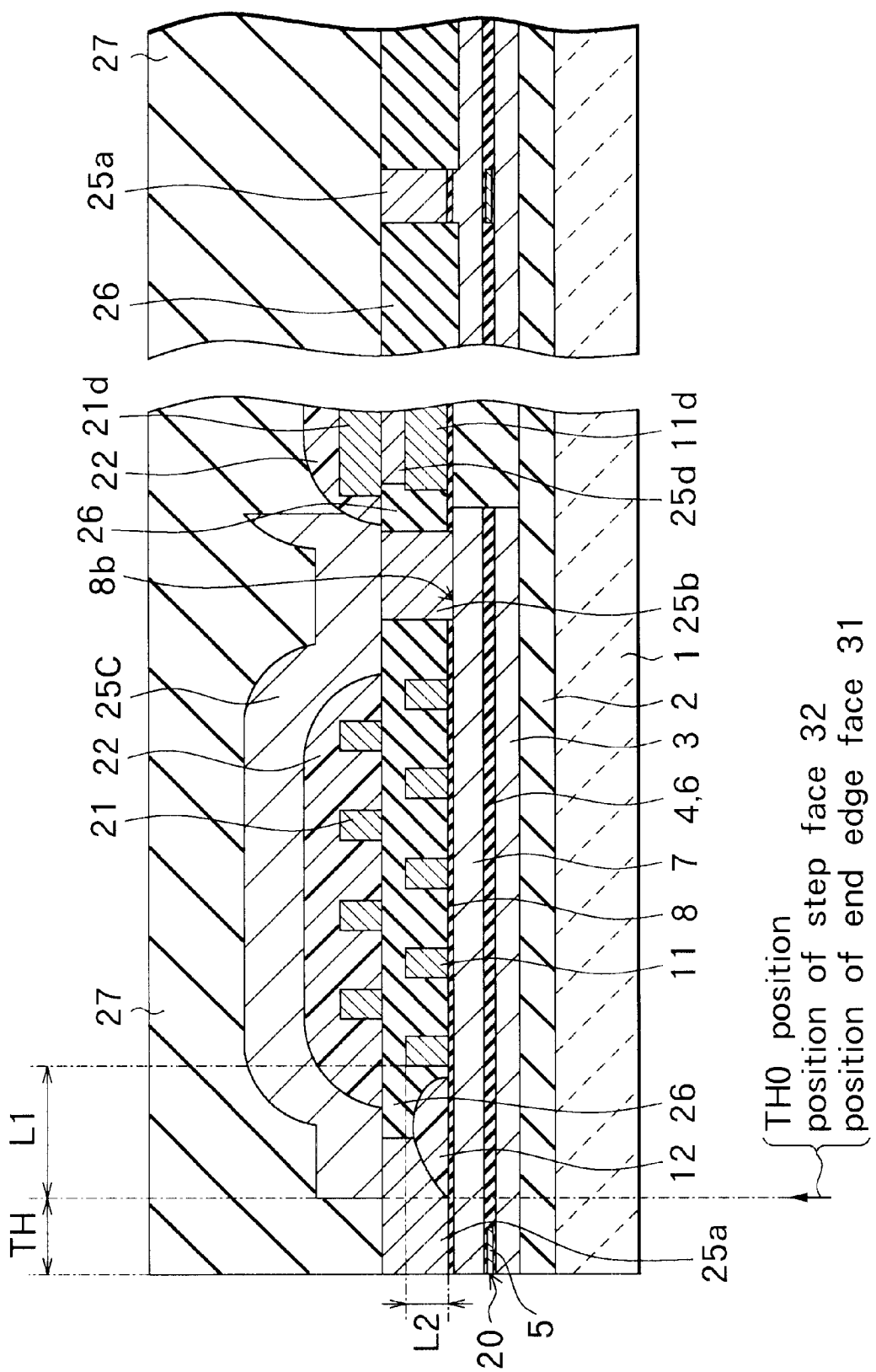

THIN FILM MAGNETIC HEAD AND METHOD OF MANUFACTURING THE SAME

BACKGROUND OF THE INVENTION

1. Field of the Invention

The invention relates to a thin film magnetic head comprising at least an inductive-type magnetoresistive transducer for writing and a method of manufacturing the same.

2. Description of the Related Art

In recent years, performance improvement in thin film magnetic heads has been sought in accordance with an increase in surface recording density of a hard disk drive. As a thin film magnetic head, a composite thin film magnetic head has been widely used. A composite thin film magnetic head has a layered structure which includes a recording head with an inductive-type transducer for writing and a reproducing head with a magnetoresistive device (also referred to as MR device in the followings) for reading-out. There are a few types of MR devices: one is an AMR device that utilizes the anisotropic magnetoresistance effect (referred to as AMR effect in the followings) and the other is a GMR device that utilizes the giant magnetoresistance effect (referred to as GMR effect in the followings). A reproducing head using an AMR device is called an AMR head or simply an MR head. A reproducing head using the GMR device is called a GMR head. The AMR head is used as a reproducing head whose surface recording density is more than 1 gigabit per square inch. The GMR head is used as a reproducing head whose surface recording density is more than 3 gigabit per square inch.

An AMR head includes an AMR film having the AMR effect. The GMR head has the similar configuration to the AMR head except that the AMR film is replaced with a GMR film having the GMR effect. However, compared to the AMR film, the GMR film exhibits a greater change in resistance under a specific external magnetic field. Accordingly, the reproducing output of the GMR head becomes about three to five times greater than that of the AMR head.

In order to improve the performance of a reproducing head, the MR film may be changed from an AMR film to a GMR film or the like which is made of a material with more excellent magnetoresistive sensitivity, or the pattern width of the MR film. Specifically the MR height may be adjusted appropriate. The MR height is the length (height) between the end of an MR device closer to an air bearing surface and the other end, and is determined by an amount of grinding when the air bearing surface is processed. The air bearing surface (ABS) is a surface of a thin film magnetic head facing a magnetic recording medium and is also called a track surface.

Performance improvement in a recording head has also been expected in accordance with the performance improvement in a reproducing head. The main factor which determines the performance of a recording head is the throat height (TH). The throat height is the length (height) of a portion of a magnetic pole from the air bearing surface to an edge of an insulating layer which electrically isolates the thin film coil. It is necessary to optimize the throat height in order to improve the performance of a recording head. The throat height is also controlled by an amount of grinding when the air bearing surface is processed.

It is necessary to increase the track density of a magnetic recording medium in order to increase the recording density among the performance of a recording head. In order to achieve this, a recording head with a narrow track structure in which the width of a bottom pole and a top pole sandwiching a write gap on the air bearing surface is required to be reduced to the order of some microns to submicron. Semiconductor process technique is used to achieve the narrow track structure.

A composite thin film magnetic head comprising a recording head and a reproducing head described above can be manufactured through a plurality of manufacturing steps such as sputtering, photolithography, electro-plating, etching, polishing and the like.

It is a problem that it requires a long lead-time to manufacture a thin film magnetic head through a series of manufacturing process including a various kinds of steps as described above. Specific improvement of methods such as reducing the number of steps is necessary in order to further shorten the lead-time in a case of mass production.

SUMMARY OF THE INVENTION

The invention has been designed to overcome the foregoing problems. An object of the invention is to provide a thin film magnetic head which has a high performance without complicating the manufacturing steps and a method of manufacturing the same.

A method of manufacturing a thin film magnetic head of the invention includes: two magnetic layers magnetically coupled to each other having two magnetic poles which face each other with a gap layer in between and are to be faced with a recording medium, a thin film coil provided between the two magnetic layers, and an insulating layer for insulating the thin film coil the two magnetic layers. One of the two magnetic layers includes: a first magnetic layer having a portion with a uniform width which defines a track width on the recording medium and a second magnetic layer which partially covers a region where the thin film coil is provided and partially overlaps to be magnetically coupled to the first magnetic layer. The method includes: a first step of forming a first thin film coil pattern and a first connection pattern in the end of the first thin film coil pattern so that the first thin film coil pattern and the first connection pattern are integrated into one body and constitute part of the thin film coil; a second step of forming the first magnetic layer and a second connection pattern, so that the first magnetic layer extends from a recording-medium-facing surface to be faced with the recording medium in a longitudinal direction and that the second connection pattern is located on the first connection pattern and constitutes part of the thin film coil; a third step of forming an insulating film as part of the insulating layer so as to cover at least the first thin film coil pattern, the first and second connection patterns, and the first magnetic layer; a fourth step of planarizing a surface of the insulating film by polishing until at least both the first magnetic layer and the second connection pattern are exposed; and a fifth step of forming a conductive layer pattern so as to be electrically connected to an exposed portion of the second connection pattern.

In a method of manufacturing a thin film magnetic head of the invention, a second connection pattern is provided on a first connection pattern provided in the end of a first thin film coil pattern through the same manufacturing step as that of a first magnetic layer. As a result, the level of the top surface of the second connection pattern is higher than that of the top surface of the first magnetic layer. Therefore, the second connection pattern is also exposed by polishing the surface of the insulating layer until the first magnetic layer is exposed after an insulating layer is formed. As the second connection pattern is formed through the same step as that of the first magnetic layer, it is not necessary to have another step of forming the second connection pattern.

A thin film magnetic head of the invention includes: two magnetic layers magnetically coupled to each other and having two magnetic poles which face each other with a gap layer in between and are to be faced with a recording medium, a thin film coil provided between the two magnetic layers, and an insulating layer for insulating the thin film coil from the two magnetic layers. One of the two magnetic layers includes: a first magnetic layer having a portion with a uniform width which defines a track width on the recording medium and a second magnetic layer which partially covers a region where the thin film coil is provided and partially overlaps to be magnetically coupled to the first magnetic layer. The thin film coil includes: a first thin film coil pattern; a first connection pattern provided in the end of the first thin film coil pattern so as to be integrated into one body with the first thin film pattern; and a second connection pattern formed on the first connection pattern, by using the same material as that of the first magnetic layer through the same step as that of forming the first magnetic layer. Also a conductive layer pattern is provided on the second connection pattern.

In a thin film magnetic head of the invention, the first connection pattern and a conductive layer are electrically connected through the second connection pattern provided therein. Thereby the first thin film coil pattern which is integrated into one body with the first connection pattern is electrically connected to the conductive layer.

In a method of manufacturing a thin film magnetic head of the invention, the first magnetic layer may be formed after the first thin film coil pattern is covered with the first insulating layer.

In a thin film head of the invention or a method of manufacturing the same, the insulating layer may be formed to include: a first insulating layer defining a forefront end of the insulating layer, the forefront end being located on the recording-medium-facing surface side; and a second insulating layer filling a space over the first insulating layer to the same level as the top of the first magnetic layer. It is preferable that the first insulating layer is formed of an organic insulating material and the second insulating layer is formed of an inorganic insulating material.

In a thin film magnetic head of the invention, it is preferable that the length from the forefront end of the first insulating layer to the forefront end portion of the first thin film coil pattern is equal to or more than the thickness of the first thin film coil pattern.

In a thin film magnetic head of the invention or a method of manufacturing the same, the conductive layer pattern may be formed as a wiring pattern for providing the first thin film coil pattern with a current. In such a case, it is preferable that the conductive layer pattern is formed of the same material as that of the second magnetic layer through the same step as that of forming the second magnetic layer.

In a method of manufacturing a thin film magnetic head of the invention, a fifth step may include a step of: forming a second thin film coil pattern on the planarized surface of the insulating film, the second thin film constituting part of the thin film coil and the conductive layer pattern is formed as a third connection pattern in the end of the second thin film coil pattern at the time of forming the second thin film coil pattern so as to be integrated into one body with the second thin film coil pattern. In such a case, a sixth step of forming a third insulating layer as part of the insulating layer so as to cover the second thin film coil pattern and the conductive layer pattern may be included.

In a thin film magnetic head of the invention, the thin film coil further includes a second thin film coil pattern provided between the first thin film pattern and the one of the tow magnetic layers with part of the insulating layer in between. In such a case, the conductive layer pattern may be formed as a third connection pattern which is integrated into one body with the second thin film coil pattern and is provided in the end of the second thin film coil pattern. The insulating layer further includes a third insulating layer which covers the second thin film coil pattern and the conductive layer pattern.

In a thin film magnetic head of the invention or a method of manufacturing the same, it is preferable that the third insulating layer is formed of an organic insulating material.

In a thin film magnetic head of the invention, it is preferable that the surface of the first insulating layer on the recording-medium-facing surface side is a given slope towards the surface of the gap layer and the average angle of the slope lies within the range of 5° and 45°.

Other and further objects, features and advantages of the invention will appear more fully from the following description.

BRIEF DESCRIPTION OF THE DRAWINGS

FIGS. 1A and 1B are cross sections for describing a step in a method of manufacturing a thin film magnetic head according to a first embodiment of the invention.

FIGS. 2A and 2B are cross sections for describing a step following FIGS. 1A and 1B.

FIGS. 3A and 3B are cross sections for describing a step following FIGS. 2A and 2B.

FIGS. 4A and 4B are cross sections for describing a step following FIGS. 3A and 3B.

FIGS. 5A and 5B are cross sections for describing a step following FIGS. 4A and 4B.

FIGS. 9A and 9B are cross sections for describing a modification example of a thin film magnetic head according to the first embodiment of the invention.

DETAILED DESCRIPTION OF THE PREFERRED EMBODIMENTS

Figures 6A, 6B:
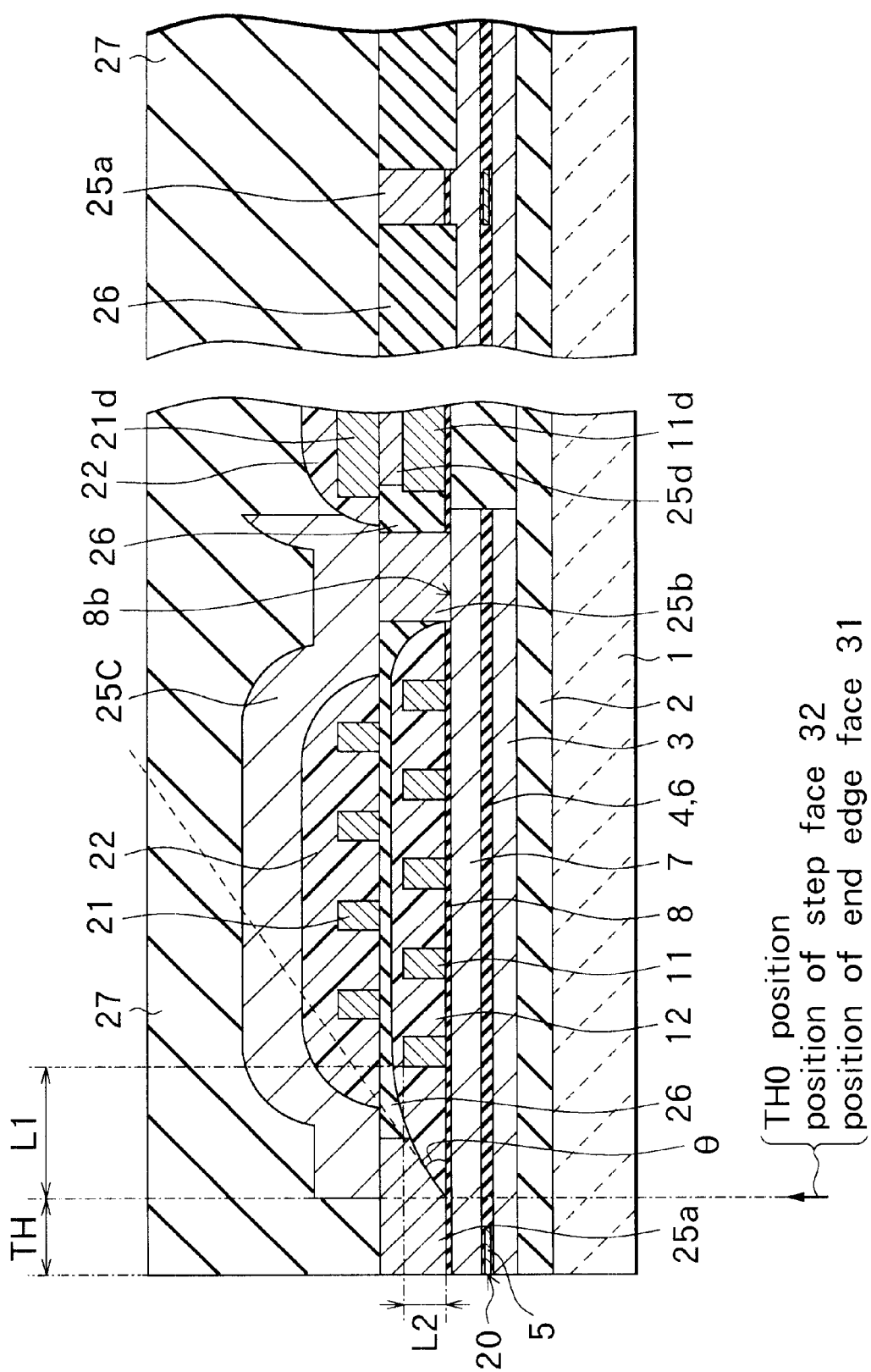
FIGS. 6A and 6B are cross sections for describing a step following FIGS. 5A and 5B.

In the followings, embodiments of the invention will be described in detail with reference to the drawings.

[First Embodiment]

With reference to FIGS. 1A and 1B to FIGS. 6A and 6B, a method of manufacturing a composite thin film magnetic head will be described as a method of manufacturing a thin film magnetic head according to the first embodiment of the invention. A thin film magnetic head according to the embodiment will be embodied and described together in a method of manufacturing a thin film magnetic head according to the embodiment. In FIGS. 1A and 1B to FIGS. 6A and 6B, "A" shows a cross section vertical to the air bearing surface and "B" shows a cross section parallel to the air bearing surface of the magnetic pole.

In the followings, in FIG. 1B, for example, the distance in the right-hand direction and the left-hand direction parallel to the air bearing surface is referred to as a "width" while in FIG. 1A, for example, the distance in a direction vertical to the air bearing surface (in the right-hand direction and the left-hand direction in the figure) is referred to as a "length". Also, in FIGS. 1A and 1B, for example, the distance in the upward direction and the downward direction in the figure is referred to as a "thickness" or a "height". Furthermore, in FIG. 1A, for example, the side (left-hand side in the figure) close to the air bearing surface in the length direction mentioned above is referred to as the "front side (or front)". On the contrary, the side further from the air bearing surface is referred to as the "rear side (or rear)".

<Method of Manufacturing a Thin Film Magnetic Head>

In a manufacturing method according to the embodiment, first, as shown in FIGS. 1A and 1B, an insulating layer 2 about 0.5 to 5 μm thick made of alumina ($Al_2O_3$), for example, is deposited on a substrate 1 made of altic ($Al_2O_3$ TiC), for example. Then, a bottom shield layer 3 for a reproducing head is formed through selectively forming permalloy (NiFe) about 2 μm thick on the insulating layer 2 by photolithography and plating.

Next, as shown in FIGS. 1A and 1B, a shield gap film 4 is formed through depositing alumina, for example, about 10 to 100 nm thick on the bottom shield layer 3 by sputtering. Then, an MR film 5 for forming an MR device composing the main part of a reproducing head is formed on the shield gap film 4 and is processed to a desired shape by photolithography with high precision. Next, a lead layer (not shown in figure) as a lead electrode layer, which is electrically connected to the MR film 5, is formed on both sides of the MR film 5. Then, a shield gap film 6 is formed on the lead layer, the shield gap film 4 and the MR film 5 so that the MR film 5 is buried in the shield gap films 4 and 6. Then, a top shield-cum-bottom pole (simply called a "bottom pole" in the followings) 7 made of permalloy, for example, about 3 to 4 μm thick is selectively formed on the shield gap film 6 by electro-plating, for example.

As shown in FIGS. 2A and 2B, a write gap layer 8 made of alumina, for example, about 0.10 to 0.3 μm thick is formed over the whole portion. At this time, in the write gap layer 8, an opening 8b through which the bottom pole 7 and a top pole 25 (a top pole tip 25a, a magnetic path forming pattern 25b and a top yoke 25c), which will be formed in a later process, are connected is formed. The write gap layer 8 corresponds to a specific example of a "gap layer" of the invention.

Figure 7:
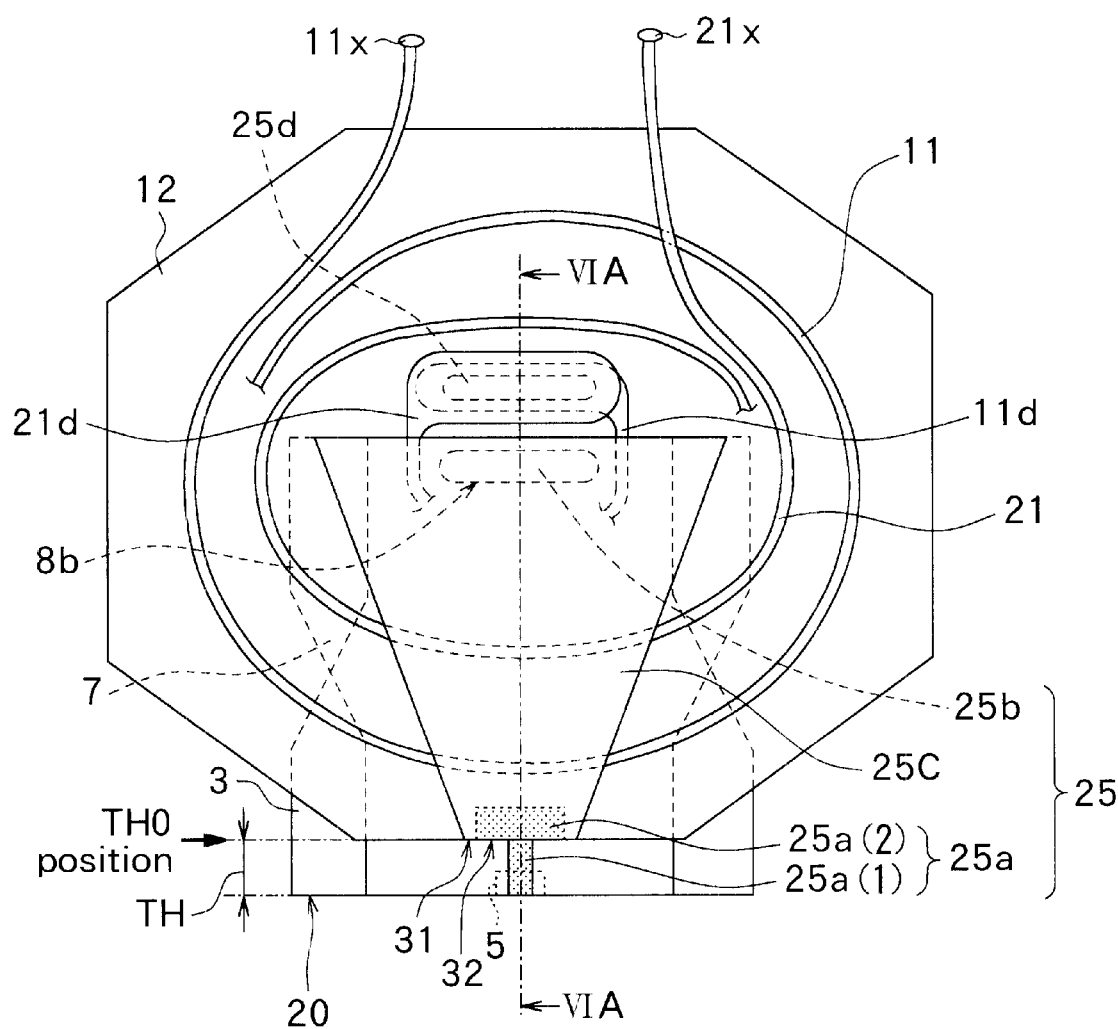
FIG. 7 shows a plan view showing the plane structure of a thin film magnetic head according to the first embodiment of the invention.

As shown in FIGS. 2A and 2B, a first layer of a thin film coil 11 for an inductive-type recording head made of copper (Cu), for example, about 1 to 3 μm thick is formed on the write gap layer 8 by electro-plating, for example. The thin film coil 11 has a spiral plane structure as shown in FIG. 7, for example, which will be described later. In FIGS. 2A and 2B, only part of the thin film coil 11 is shown. When the thin film coil 11 is formed, a coil connection 11d is formed at the same time on the write gap layer 8 in the inner end of the thin film coil 11 as one body. The coil connection 11d is for electrically connecting the thin film coil 11 and a connection middle pattern 25d (FIG. 3A) which will be formed in a later process. The first layer of the thin film coil 11 corresponds to a specific example of a "first thin film coil layer" of the invention and the coil connection 11d corresponds to a specific example of a "first connection pattern" of the invention.

As shown in FIGS. 3A and 3B, an insulating film 12 is formed in a predetermined pattern so as to cover the thin film coil 11 and the write gap layer 8 in the peripheral region using an organic insulating material such as photoresist which exhibits liquidity by applying heat through photolithography with high precision. The insulating film 12 defines the throat height 0 position (TH0 position), which will be described later, for determining the throat height TH and buries the gaps between the turns of the thin film coil 11. The opening 8b of the write gap layer 8 is not to be covered by the insulating film 12 at the time of forming the insulating film.

As shown in FIGS. 3A and 3B, the end edge in the forefront (called the forefront end in the followings) of the insulating film 12 may be in the position shifted to rear or to front of the position corresponded to the end edge in the most rear (called the most rear end in the followings) of the MR film 5.

In order to planarize the insulating film 12 and to improve the insulating characteristic between the turns of the thin film coil 11, a heat treatment at about 200° C., for example, is applied to the insulating film 12. By applying the heat treatment, the neighboring area of the forefront end and the most rear end of the insulating film 12 become rounded slopes as shown in FIG. 3A. The neighboring area of the other edge in other portion of the insulating film 12 also becomes a rounded slope. The insulating film 12 corresponds to a specific example of a "first insulating layer" of the invention.

As shown in FIG. 3A, a top pole tip 25a about 3 to 5 μm thick, which forms part of a top pole 25, is selectively formed in the region from the front slope (left-hand side slope in the figure) of the insulating film 12 to the region (left-hand side in the figure) which becomes an air bearing surface 20 in a later process by electro-plating, for example. The top pole tip 25a has a plan shape shown in FIG. 7, for example, which will be described later. The distinctive figure of the top pole tip 25a will be described later. When the top pole tip 25a is formed, at the same time, a magnetic path forming pattern 25b forming part of the top pole 25 is formed on the opening 8b while the connection middle pattern 25d is formed on the coil connection 11d. The connection middle pattern 25d is for electrically connecting the coil connection 11d and a coil connection 21d which will be formed in a later process. For example, high saturation magnetic flux density materials such as permalloy (NiFe) alloy or ferrous nitride (FeN) alloy are used for the top pole tip 25a, the magnetic path forming pattern 25b and the connection middle pattern 25d. At this time, damages or the like on the thin film coil 11 at the time of forming the top pole tip 25a and the like are avoided since the thin film coil 11 is covered by the insulating film 12. The top pole tip 25a corresponds to a specific example of a "first magnetic layer" of the invention and the connection middle pattern 25d corresponds to a specific example of a "second connection pattern" of the invention.

As shown in FIG. 3B, a trim structure is formed through etching the write gap layer 8 in the peripheral region of the top pole tip 25a and the bottom pole 7 about 0.5 μm in a self-aligned manner through, for example, ion milling or dry etching by RIE using chlorine gas ($Cl_2$, $CF_4$, $BCl_2$, $SF_6$ or the like) using the top pole tip 25a as a mask.

As shown in FIGS. 4A and 4B, an insulating film 26 about 3 to 4 μm thick is formed over the whole portion using an inorganic insulating material such as alumina. Then, the whole portion is polished and planarized by CMP (Chemical Machine Polishing), for example, so that the top pole tip 25a, the magnetic path forming pattern 25b and the connection middle pattern 25d are exposed. The insulating film 26 corresponds to a specific example of a "second insulating layer" of the invention.

As shown in FIGS. 5A and 5B, a second layer of a thin film coil 21 made of, for example, copper (Cu) about 2 to 3 μm thick is formed on the flat area of the insulating film 26 through the same electro-plating process as the case where the first layer of the thin film coil 11 is formed. The thin film coil 21 has the same plan shape as that of the thin film coil 11. When the thin film coil 21 is formed, a coil connection 21d is formed at the same time on the connection middle pattern 25d in the inner end of the thin film coil 21 as one body. The thin film coil 11 and the thin film coil 21 are electrically connected through the coil connection 11d, the connection middle pattern 25d and the coil connection 21d. The second layer of the thin film coil 21 corresponds to a specific example of a "second thin film coil layer" of the invention and the coil connection 21d corresponds to a "conductive layer pattern" as a "third connection pattern" of the invention.

As shown in FIGS. 5A and 5B, an insulating film 22 is formed in a predetermined pattern so as to cover the thin film coil 21 and the insulating film 26 in the peripheral region using the same organic insulating material as the insulating film 12 such as photoresist through photolithography with high precision. At the same time, the insulating film 22 is also formed on the coil connection 21d and the insulating film 26 in the peripheral region. The exposed surface of the magnetic path forming pattern 25b is not to be covered by the insulating film 22 at the time of forming the insulating film.

Then, the same heat treatment as the case of the insulating film 12 is applied to the insulating film 22. By applying the heat treatment, the outer edge area of the insulating film 22 also becomes a slope as the case of the insulating film 12. The insulating film 22 corresponds to a specific example of a "third insulating layer" of the invention and the insulating film 12, the insulating film 26 and the insulating film 22 correspond to specific examples of a "insulating layer" of the invention.

As shown in FIGS. 6A and 6B, a top yoke 25c about 3 to 5 μm thick which forms part of the top pole 25 is formed through the same electro-plating process as the case where the top pole tip 25a and the magnetic path forming pattern 25b are formed. The top yoke 25c has a plan shape shown in FIG. 7, for example, which will be described later. The top yoke 25c is formed such that, for example, the forefront end of the top yoke 25c meets the forefront end of the insulating film 12. The top yoke 25c is magnetically coupled to the bottom pole 7 in the opening 8b through the magnetic path forming pattern 25b and is also magnetically coupled to the top pole tip 25a in the forefront portion. The top yoke 25c is made the same material as that of the top pole tip 25a and the magnetic path forming pattern 25b, for example. The top yoke 25c corresponds to a specific example of a "second magnetic layer" of the invention. The top pole 25 (the top pole tip 25a, the magnetic path forming pattern 25b and the top yoke 25c) corresponds to a specific example of "one of the two magnetic layers" of the invention.

As shown in FIGS. 6A and 6B, an overcoat layer 27 made of alumina, for example, is formed to cover the whole portion. At last, the air bearing surface 20 of the recording head and the reproducing head is formed by machine process such as slider. Thereby, a thin film magnetic head is completed.

<Configuration of a Thin Film Magnetic Head>

The configuration of a thin film magnetic head according to the embodiment will be described with reference to FIG. 7.

FIG. 7 is a plan view showing a draft of the plan structure of a thin film magnetic head manufactured by a method of manufacturing a thin film magnetic head according to the embodiment. In FIG. 7, the insulating film 22, the insulating film 26 and the overcoat layer 27 and the like are omitted. Also, regarding the thin film coils 11, 21 and the insulating film 12, only the outermost portion of the thin film coils 11, 21 and only the outermost end of the insulating film 12 are shown in the figure. FIG. 6A corresponds to a perspective view taken along the line VIA—VIA line in FIG. 7.

As shown in FIG. 7, the position of the forefront end of the insulating film 12 is the reference position for determining the throat height, that is, the throat height 0 position. The above-mentioned "throat height: TH" is one of the important factors for determining the performance of a recording head. The throat height (TH) is defined as the length from the end edge of the insulating layer (the insulating films 12, 22 and 26) closest to the air bearing surface 20, which electrically isolates the thin film coils 11 and 21 for generating magnetic flux, that is, the forefront end of the insulating film 12 (called "throat height 0 position: TH0 position" in the followings) to the air bearing surface 20. In order to improve the performance of a recording head, the most suitable throat height (TH) is desired. The throat height (TH) is controlled by an amount of grinding at the time of forming the air bearing surface 20.

The top pole 25 includes the top pole tip 25a, the magnetic path forming pattern 25b and the top yoke 25c. In other words, the top pole 25 is an aggregation of each of the above-mentioned portions which are separately formed. The top yoke 25c has a trapezoid plan shape, for example, and the width becomes gradually narrower towards the air bearing surface 20. The width of the front end edge of the top yoke 25c is wider than that of a middle portion 25a(2) of the top pole tip 25a, which will be described later. However, it is not necessarily limited to such a case but also, for example, the width of the top yoke 25c may be narrower than the width of the middle portion 25a(2). The top pole tip 25a has a T-shaped plan shape, for example, and includes the tip 25a(1) and the middle portion 25a(2) in this order from the air bearing surface 20. Both the tip 25a(1) and the middle portion 25a(2) have a rectangular plan shape and the width of the tip 25a(1) is narrower than the width of the middle portion 25a(2). In other words, there is a step in the connection of the tip 25a(1) and the middle portion 25a(2) in the width direction. The width of the tip 25a(1) defines the recording track width on a recording medium. Both of the positions of an end edge face 31 in front of the top yoke 25c and a step face 32 in the step of the top pole tip 25a on the middle portion 25a(2) side meet the TH0 position. The centers of the top yoke 25c and the top pole tip 25a in each width direction meet each other.

As shown in FIGS. 6A, 6B and FIG. 7, part of the front side of the top yoke 25c is partially overlapping and magnetically coupled to the middle portion 25a (2) of the top pole tip 25a. Also, the top yoke 25c is magnetically coupled to the bottom pole 7 in the opening 8b through the magnetic path forming pattern 25b.

The thin film coil 11 and the thin film coil 21 are coils both having a plan shape in which the coils are whirling in the same direction. The thin film coil 11 and the thin film coil 21 are electrically connected to each other in each of the inner end through the coil connection 11d, the connection middle pattern 25d and the coil connection 21d. The peripheral ends 11x and 21x of both the thin film coil 11 and the thin film coil 21 are connected to an outer circuit (not shown in the figure). The thin film coil 11 and the thin film coil 21 can be energized by the outer circuit.

As can be seen from FIGS. 6A, 6B and FIG. 7, the tip 25a(1) of the top pole tip 25a is extended onto the flat write gap layer 8, and the middle portion 25a(2) is extended onto the slope on the front side of the insulating film 12.

Referring back to FIGS. 6A and 6B, the apex angle (θ) which, like the above-mentioned throat height (TH), is one of the important factors for determining the performance of a recording head is described. As shown in FIGS. 6A and 6B, "apex angle: θ" is the average angle of the region of the slope in the front portion of the insulating film 12, which is from the forefront end of the insulating film 12 to the most rear end of the top pole tip 25a. In the embodiment, it is preferable that the apex angle lies within the range of 5° and 45°.

As shown in FIGS. 6A and 6B, it is preferable that the length L1 which is from the forefront end of the insulating film 12 to the forefront end of the thin film coil 11 (the outermost edge) is equal to or more than the thickness L2 of the thin film coil 11 (L1≧L2).

<Operation of a Thin Film Magnetic Head>

With reference to FIG. 7, operations of a thin film magnetic head according to the embodiment will be described.

First, the basic operation of a thin film magnetic head, that is, recording data onto a recording medium and reproducing data from a recording medium will be briefly described.

In a thin film magnetic head according to the embodiment, when current is flown into the thin film coils 11 and 21 through an outer circuit (not shown in the figure) at the time of recording information, magnetic flux generates. The generated magnetic flux is propagated inside the top yoke 25c, and is propagated to the tip 25a(1) via the middle portion 25a(2) of the top pole tip 25a which is magnetically coupled to the top yoke 25c. The magnetic flux propagated to the tip 25a(1) further reaches the tip on the air bearing surface 20 side and generates a signal magnetic field for recording in the outer region near the write gap layer 8. By the signal magnetic field, information can be recorded through partially magnetizing the magnetic recording medium. In a thin film magnetic head which performs such recording operation, it is necessary to smoothly and sufficiently supply the magnetic flux generated in the thin film coils 11 and 21 to the tip of the tip 25a(1) in order to attain an excellent overwrite characteristic.

On the contrary, sense current is flown into the MR film 5 of the reproducing head at the time of reproducing information. The resistance value of the MR film 5 changes according to the reproduction signal magnetic field from the magnetic recording medium. Therefore, through detecting the changes of the resistance by the changes of the sense current, information recorded on the magnetic recording medium can be read out.

In a thin film magnetic head according to the embodiment, by gradually narrowing the widths of the top yoke 25c, the middle portion 25a(2) and the tip 25a(1) forming the propagation path of the magnetic flux, the amount of the magnetic flux which can be stored inside each above-mentioned part, that is, the magnetic volume is gradually to be decreased. Thereby, the magnetic flux generated in the thin film coils 11 and 21, as it propagates each above-mentioned part, is gradually converged according to reduction of the magnetic volume in each part. Therefore, the magnetic flux reaches the tip of the tip 25a(1) without saturating on the way. As a result, an excellent overwrite characteristic can be attained.

<Operation and Effect of a Method of Manufacturing a Thin Film Magnetic Head>

With reference to FIGS. 6A, 6B and FIGS. 8A, 8B, distinctive operations and effects of a method of manufacturing a thin film magnetic head according to the embodiment will be described in the followings by comparing to another method of manufacturing a thin film magnetic head as a comparison. In the followings, only the distinctive process will be mainly described and the same process as described earlier will be omitted.

Figures 8A, 8B:
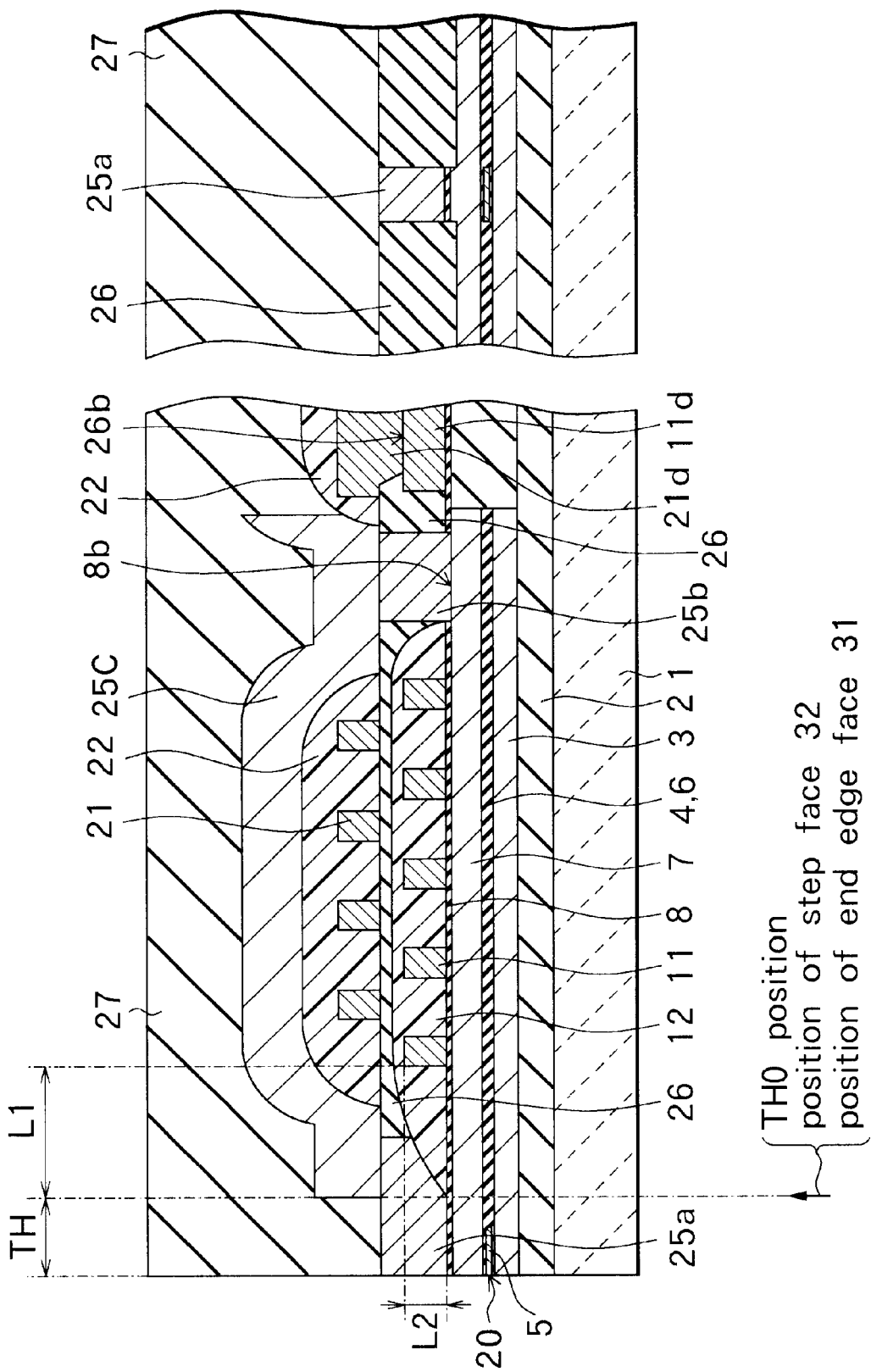
FIGS. 8A and 8B are cross sections for describing a method of manufacturing a thin film magnetic head as a comparison to a method of manufacturing a thin film magnetic head according to the first embodiment of the invention.

FIGS. 8A and 8B are cross sections for describing a method of manufacturing a thin film magnetic head as a comparison to a method of manufacturing a thin film magnetic head according to the embodiment, and correspond to the cross sections shown in FIGS. 6A and 6B. In FIGS. 8A and 8B, identical reference numerals are given to the elements identical to those shown in FIGS. 6A and 6B. In a method of manufacturing a thin film magnetic head as a comparison shown in FIGS. 8A and 8B, a connection middle pattern 25d is not formed on a coil connection 11d, and a coil connection 21d is directly formed on the coil connection 11d. In a case where such a manufacturing method is used, after the insulating film 26 is formed, the coil connection 11d can not be exposed to the polished surface of the insulating film 26 when the surface of the insulating film 26 is polished until the top pole tip 25a and the magnetic path forming pattern 25b are exposed, since the upper portion of the coil connection 11d is covered by the insulating film 26. Therefore, in order to electrically connect the coil connection 11d and a coil connection 21d which will be formed in a later process, it is necessary to form an opening 26b by partially removing the insulating film 26 which lies between the coil connections 11d and 21d by etching, for example.

On the contrary, in a method of manufacturing a thin film magnetic head according to the embodiment shown in FIGS. 6A and 6B, the coil connection 11d and the connection middle pattern 25d are electrically connected by forming the connection middle pattern 25d on the coil connection 11d, and the upper surface of the connection pattern 25d is to be higher than the upper surfaces of the top pole tip 25a and the magnetic path forming pattern 25b. In a case where such a manufacturing method is used, after the insulating film 26 is formed, the connection middle pattern 25d also can be exposed on the polished surface when the surface of the insulating film 26 is polished until the top pole tip 25a and the magnetic path forming pattern 25b are exposed. Therefore, in a manufacturing method according to the embodiment, the coil connection 11d and the coil connection 21 can be electrically connected through the connection middle pattern 25d without a step of forming the opening 26b described in the above-mentioned manufacturing method (FIGS. 8A and 8B) as a comparison. In addition, in a manufacturing method according to the embodiment, it is not necessary to have another step of forming a connection middle pattern 25d since the connection middle pattern 25d is formed in the same step as the step of forming the top pole tip 25a.

As described, in a method of manufacturing a thin film magnetic head according to the embodiment, the coil connection 11d and the connection middle pattern 25d are electrically connected by forming the connection middle pattern 25d on the coil connection 11d in the same step as that of forming the top pole tip 25a. Thereby, the upper surface of the connection middle pattern 25d is higher than the upper surfaces of the top pole tip 25a and the magnetic path forming pattern 25b. Therefore, the connection middle pattern 25d also can be exposed by polishing the surface of the insulating film 26 until the top pole tip 25a and the magnetic path forming pattern 25b are exposed. As a result, it is not necessary to have a step of forming the opening 26b which is necessary in the comparison method shown in FIGS. 8A and 8B. In addition, in the embodiment, it is not necessary to have another step of forming the connection middle pattern 25d since the connection middle pattern 25d is formed in the same step as the step of forming the top pole tip 25a. Thereby, in a case where a thin film magnetic head having the distinctive configuration as described in the embodiment, the number of manufacturing steps can be reduced.

In the embodiment, the insulating films 12 and 22 are formed using an organic insulating material such as photoresist which exhibits liquidity by applying heat so that between each turn of the thin film coils 11 and 21 can be buried by the insulating films 12 and 22 without a space. As a result, between each turn of the thin film coils 11 and 21 can be successfully insulated. Furthermore, by using photoresist for the insulating film 12, the surface near the outer edge of the insulating film 12 can be easily processed to slope. In this case, especially, since the front portion of the insulating film 12 is a slope, magnetic flux can be smoothly propagated from the top yoke 25c to the tip 25a(1) of the top pole tip 25a.

In the embodiment, specifically, the apex angle ($\theta$), that is, the average angle of the region of the slope in the front portion of the insulating film 12, which is from the forefront end of the insulating film 12 to the most rear end of the top pole tip 25a, lies within the range of 5° and 45°. Thereby, various kinds of problems in manufacturing the thin film magnetic head and the performance can be avoided by providing the apex angle ($\theta$) most suitable. Specifically, the problems in a case where the apex angle ($\theta$) is beyond the above-mentioned range are as follows. When the apex angle ($\theta$) is smaller than 5°, the overwrite characteristic is deteriorated since the saturation point of the magnetic flux is shifted to rear (the thin film coil 11 side) when the magnetic flux flows inside the middle portion 25a (2) of the top pole tip 25a. Therefore, propagation of the magnetic flux from the top yoke 25c to the tip 25a (1) of the top pole tip 25a is suppressed. When the apex angle ($\theta$) is greater than 45°, precision of forming a photoresist pattern for forming the top pole tip 25a is lessened under the influence of the reflected light from the front slope of the insulating film 12 at the time of exposure during photolithography. Also, the overwrite characteristic is deteriorated since the magnetic flux is saturated in the middle portion 25a(2) due to reduction of the magnetic volume.

In the embodiment, the insulating film 26 is formed using alumina, for example, as an organic insulating material. Therefore, unlike the case where a soft material such as photoresist is used for the insulating film 26, deterioration in polishing performance such as clogging in the polishing surface at the time of polishing the surface of the insulating film 26 by CMP can be avoided, and the polished surface can be formed smoother.

In the embodiment, the thin film coil 11 is formed and then the top pole tip 25a is formed after the thin film coil 11 is covered by the insulating film 12 which defines the throat height 0 position (TH0). Therefore, the insulating film 12 also functions as a protection film for the thin film coil 11 so that damages on the thin film coil 11 can be avoided at the time of forming the top pole tip 25a. Also, unlike the case where the top pole tip 25a is formed before the thin film coil 11 is formed, it is not necessary to have a step of forming a protection film other than the insulating film 12 in order to avoid damages on the top pole tip 25a at the time of forming the thin film coil 11. Thereby, the number of manufacturing steps can be reduced.

In a thin film magnetic head according to the embodiment, the length L1 which is from the forefront end of the insulating film 12 to the forefront end of the thin film coil 11 (the outermost edge) is equal to or more than the thickness L2 of the thin film coil 11 ($L1 \geqq L2$). Therefore, the average angle of the front slope of the insulating film 12 can be made smaller. As a result, the above-mentioned apex angle ($\theta$) can also be made smaller. Specifically, it can be within the range of 5° and 45°.

In the embodiment, as shown in FIG. 7, the coil connections 11d and 21d are provided in the inner ends of the thin film coils 11 and 21, respectively. However, it is not limited to this. For example, the coil connections 11d and 21d may be provided in the peripheral ends of the thin film coils 11 and 21, respectively.

In the embodiment, as shown in FIGS. 6A, 6B and FIG. 7, the insulating film 12 buries the whole portion of the thin film coil 11. However, it is not limited to this. For example, the insulating film 12 may bury only the outermost portion of the thin film coil 11 as long as the throat height 0 position (TH0 position) is defined by the forefront end of the insulating film 12. Also, as shown in FIGS. 9A and 9B, the most rear end of the insulating film 12 may be in the position in front of the forefront end of the outermost portion of the thin film coil 11. In this case, the most rear end of the insulating film 12 needs to be in the rear position of the most rear end of the top pole tip 25a.

In the embodiment, as shown in FIG. 7, for example, although the case where the top yoke 25c has a trapezoid plan shape and the top pole tip 25a has a T-shaped plan shape is described, it is not necessarily limited to this. The shapes of the top yoke 25c and the top pole tip 25a can be various kinds. However, it is necessary to determine the shapes by adjusting the magnetic volume of each portion of the top yoke 25c and the top pole tip 25a so that the magnetic flux does not saturate on the way. It is because, as described, each portion of the top yoke 25c and the top pole tip 25a forms the propagation path of the magnetic flux and the shapes determine the magnetic volume which greatly contributes to the propagation condition of the magnetic flux.

[Second Embodiment]

A second embodiment of the invention will be described.

Figures 10A, 10B:
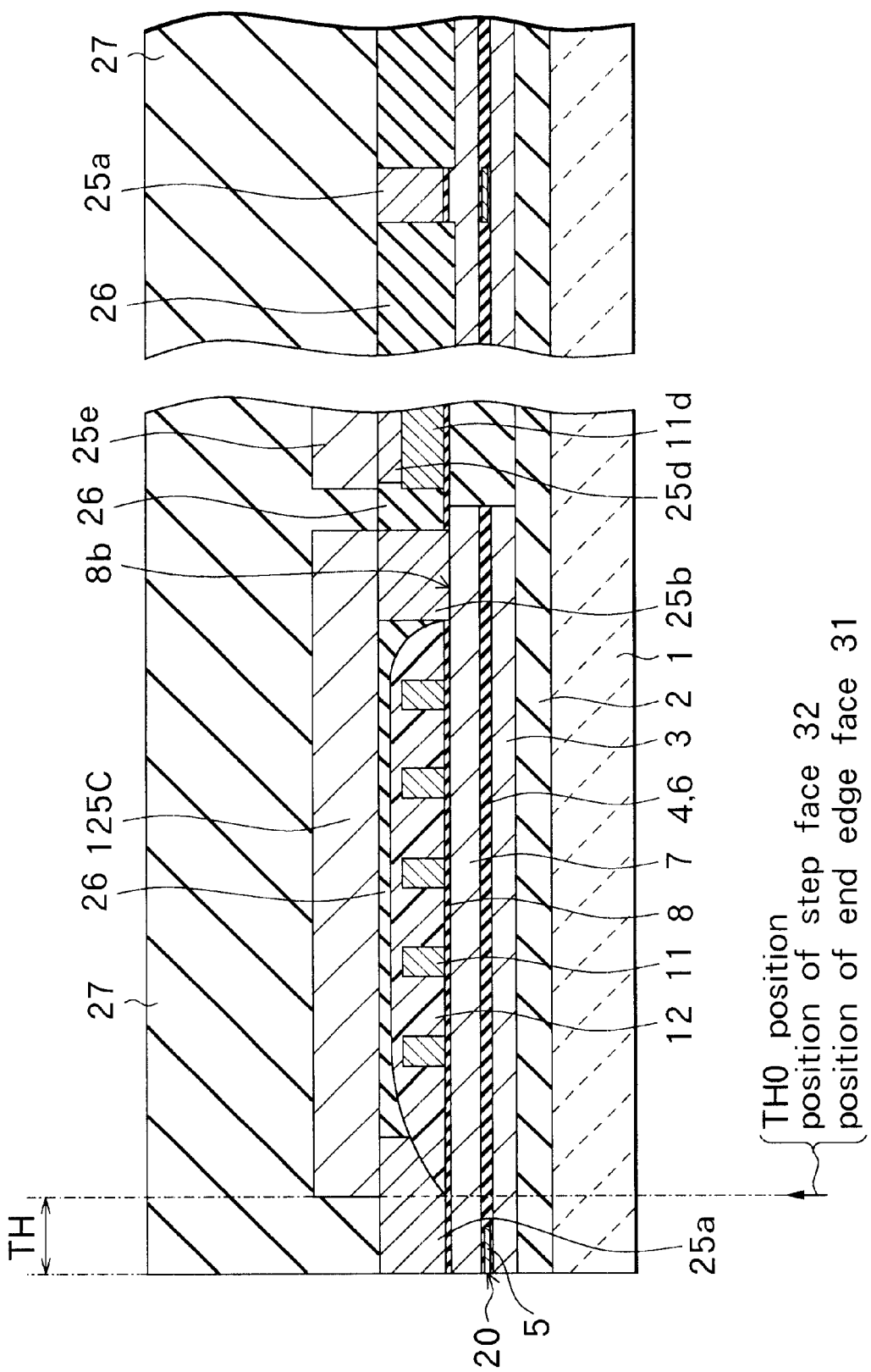
FIGS. 10A and 10B are cross sections for describing the sectional structure of a thin film magnetic head according to a second embodiment of the invention.

First, with reference to FIGS. 10A and 10B, a method of manufacturing a composite thin film magnetic head will be described as a method of manufacturing a thin film magnetic head according to the second embodiment of the invention. A thin film magnetic head according to the embodiment will be embodied and described together in a method of manufacturing a thin film magnetic head according to the embodiment. FIGS. 10A and 10B shows the configuration of a composite thin film magnetic head manufactured through a method of manufacturing a thin film magnetic head according to the embodiment. FIG. 10A shows a cross section vertical to the air bearing surface and FIG. 10B shows a cross section parallel to the air bearing surface of the magnetic pole. In FIGS. 10A and 10B, identical reference numerals are given to the elements identical to those of the first embodiment.

A thin film magnetic head according to the embodiment has a coil portion comprising one thin film coil (thin film coil 11) unlike the first embodiment which has a thin film coil portion comprising two thin film coils (thin film coils 11 an 21).

In a method of manufacturing a thin film magnetic head according to the embodiment, the step shown in FIGS. 10A and 10B until the surface of the insulating film 26 is polished by CMP to be planarized will not be described since the step is the same as that of the first embodiment shown in FIGS. 4A and 4B.

Figure 11:
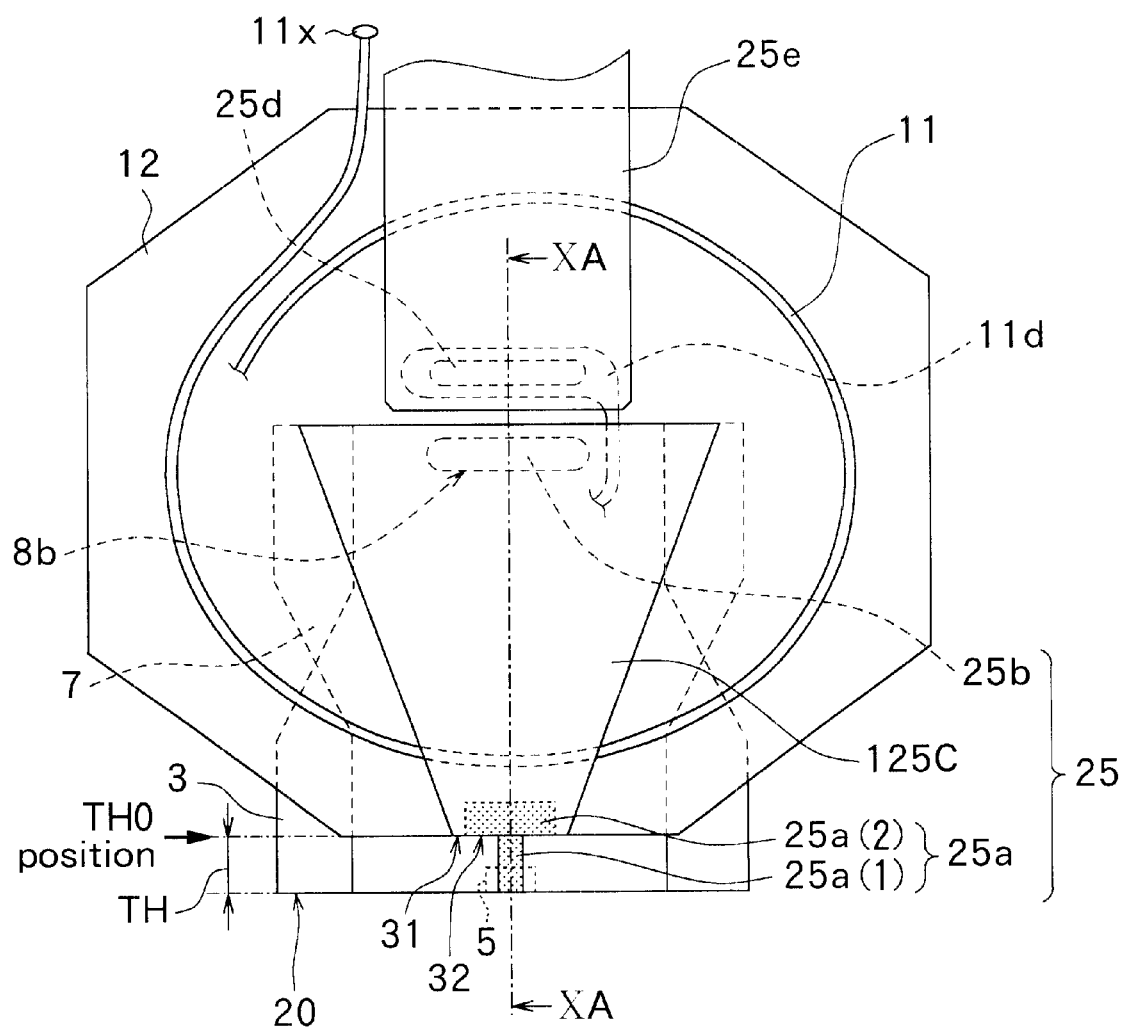
FIG. 11 is a plan view showing the plane structure of a thin film magnetic head according to the second embodiment of the invention.

In the embodiment, as shown in FIGS. 10A and 10B, the surface of the insulating film 26 is polished by CMP to be planarized and the top pole tip 25a, the magnetic path forming pattern 25a and the connection middle pattern 25d are exposed. Then, a top yoke 125c forming part of the top pole 25 is formed on the polished and planarized surface by the same material and the same steps as those of the first embodiment. A coil wiring 25e is formed on the connection middle pattern 25d at the same time when the top yoke 125c is formed. The coil wiring 25e has a plan shape, for example, as shown in FIG. 11 which will be described later and is for energizing the thin film coil 11. The coil wiring 25e is electrically connected to the thin film coil 11 through the coil connection 11d and the connection middle pattern 25d. For example, the same high saturation magnetic flux density material used for the top yoke 125c such as permalloy (NiFe) alloy or ferrous nitride (FeN) alloy are used for the coil wiring 25e. The coil wiring 25e corresponds to a specific example of a "conductive layer pattern" as a "wiring pattern" of the invention.

As shown in FIG. 11, after an overcoat layer 27 made of alumina, for example, is formed on the whole portion, the air bearing surface 20 is formed using a slider or the like. Thereby, a thin film magnetic head is completed.

FIG. 11 is a plan view showing an outline of the plane structure of a thin film magnetic head manufactured through a method of manufacturing a thin film magnetic head according to the embodiment. In FIG. 11, identical reference numerals are given to the elements identical to those of the first embodiment shown in FIG. 7. In FIG. 11, the insulating film 26 and the overcoat layer 27 are omitted. Also, only the outermost portion of the thin film coil 11 and the outermost end of the insulating film 12 are shown in the figure. FIG. 10A corresponds to a perspective view taken along the line XA—XA in FIG. 11.

As shown in FIGS. 10A, 10B and FIG. 11, the coil wiring 25e is electrically connected to the connection middle pattern 25d and the coil connection 11d provided in the inner end of the thin film coil 11, and is also electrically connected to the thin film coil 11 thereby. The rear portion of the coil wiring 25e and the peripheral end 11x of the thin film coil 11 are connected to an outer circuit (not shown in the figure). By the outer circuit, the thin film coil 11 can be energized through the coil wiring 25e. The distinctive configuration of the parts other than those shown in FIG. 11 is same as those of the first embodiment (FIG. 7).

In a thin film magnetic head having such a configuration, the magnetic flux generated by energizing the thin film coil 11 through the coil wiring 25e is gradually converged on the way being propagated from the top yoke 125c to the top pole tip 25a according to the gradual reduction of the magnetic volume in each portion of the propagation path, and at last sufficiently reaches the tip 25a(1) of the top pole tip 25a. Therefore, an excellent overwrite characteristic like the first embodiment can be attained by the propagation and convergence of the magnetic flux.

In the embodiment, also, the connection middle pattern 25d is formed on the coil connection 11d in the same step of forming the top pole tip 25a. Therefore, like the first embodiment, the connection middle pattern 25d can be also exposed when the surface of the insulating film 26 is polished by CMP until the top pole tip 25a and the magnetic path forming pattern 25b are exposed. As a result, the connection middle pattern 25d can be electrically connected to the coil wiring 25e without a step of forming the opening 26b, which is necessary in the above-mentioned comparison shown in FIGS. 8A and 8B. Thereby, the number of manufacturing steps can be reduced like the first embodiment.

In the embodiment, the top yoke 125c is formed on the flat portion polished by CMP. Therefore, the photoresist pattern for forming the top yoke 125c can be formed by photolithography with high precision. 75. Other operation, effects, modifications and the like regarding a thin film magnetic head and a method of manufacturing the same according to the embodiment are identical to those of the first embodiment. Therefore, the description will be omitted.

The invention has been described by referring to a number of embodiments. However, the invention is not limited to the embodiments but also various kinds of modifications are possible. For example, in the above-mentioned embodiments, permalloy (NiFe), ferrous nitride (FeN) or the like is used for the top pole tip 25a, the magnetic path forming pattern 25b, the top yoke 25c and the connection middle pattern 25d and the like. However, high saturation magnetic flux density materials such as amorphous Fe—Co—Zr may be used. Also, two or more kinds of the high saturation magnetic flux density materials may be stacked to be used. In addition, a magnetic material in which NiFe and the above-mentioned high saturation magnetic flux density materials are stacked may be used for the bottom pole 7.

For example, in the above-mentioned embodiments and the modification example, the case where the foundation (the write gap layer 8) on which the thin film coil 11 and the coil connection 11d are to be provided forms the same plane is described. However, it is not limited to such a case. The invention may also be applied to the case where there are some steps between the foundation on which the insulating film 11 and the coil connection 11d are to be provided. The invention is also effective as long as provided the top pole tip 25a and the connection middle pattern 25d can be exposed by polishing the surface of the insulating film 26 after the insulating film 26 is formed.

For example, in the above-mentioned embodiments and the modification example, a method of manufacturing a composite thin film magnetic head is described. However, the invention is also applied to a thin film magnetic head for recording only having an inductive-type magnetic transducer for writing or a thin film magnetic head having an inductive-type magnetic transducer for both recording and reproducing. The invention is also applied to a thin film magnetic head in which the device for writing and the device for reading-out are stacked in the reversed order.

As described, according to a method of manufacturing a thin film magnetic head of the invention, the second connection pattern is formed on the first connection pattern and electrically connected thereto in the same step of forming the first magnetic layer. Therefore, it is not necessary to have a step of forming an opening by removing part of the insulating layer for electrically connecting the first connection pattern and the conductive pattern. Thereby, the number of manufacturing steps can be reduced.

Specifically, in such a case that the first magnetic layer is formed after the first thin film coil is covered by the first insulating layer, damages on the first thin film coil pattern can be avoided during forming the first magnetic layer. Also, the number of manufacturing steps can be reduced comparing to the case where the first magnetic layer is formed before the first thin film coil layer is formed.

In such a case that the first insulating layer is formed of an organic insulating material and the second insulating layer is formed of an inorganic material, insulation between each turn of the first thin film coil pattern is secured. Also, precision of processing in the step of polishing for planarization can be improved and problems during polishing process can be avoided.

In such a case that the third insulating layer is formed of an organic insulating material, insulation between each turns of the second thin film coil pattern is secured.

In such a case that the second connection pattern is provided between the first connection pattern and the conductive layer pattern the first connection pattern and the conductive layer pattern can be electrically connected through the second connection pattern. Thereby, in such a case that the conductive layer pattern is, for example, the wiring pattern for providing the first thin film coil pattern with a current, the wiring pattern and the first thin film coil pattern can be electrically connected. In such a case that the conductive layer pattern is, for example, the third connection pattern the first thin film coil pattern and the second thin film coil pattern can be electrically connected.

In such a case that the length from the forefront end of the first insulating layer to the forefront end the first thin film coil pattern is equal to or more than the thickness of the first thin film coil pattern, the average angle of the slope of the first insulating layer on the recording-medium-facing surface side is reduced. Thereby, the magnetic flux in the region corresponding to the slope can be smoothened.

In such a case that the surface of the first insulating layer on the recording-medium-facing surface side is given a slop towards the surface of the write gap layer, and the average angle of the above-mentioned slope lies within the range of 5° and 45°, manufacturing condition (precision of forming the first magnetic pattern and the like) and performance (overwrite characteristic and the like) of a thin film magnetic head can properly be balanced.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head including: two magnetic layers magnetically coupled to each other having two magnetic poles which face each other with a gap layer in between and are to be faced with a recording medium, a thin film coil provided between the two magnetic layers, and an insulating layer for insulating the thin film coil from the two magnetic layers, while one of the two magnetic layers includes:

a first magnetic layer having a portion with a uniform width which defines a track width on the recording medium and a second magnetic layer which partially covers a region where the thin film coil is provided and partially overlaps to be magnetically coupled to the first magnetic layer; wherein the thin film coil includes:

a first thin film coil pattern;

a first connection pattern provided in the end of the first thin film coil pattern so as to be integrated into one body with the first thin film pattern; and a second connection pattern formed on the first connection pattern, by using the same material as that of the first magnetic layer through the same step as that of forming the first magnetic layer: wherein a conductive layer pattern is provided on the second connection pattern.

2. A thin film magnetic head according to claim 1, wherein the insulating layer includes:

a first insulating layer defining a forefront end of the insulating layer, the forefront end being located on the recording-medium-facing surface side; and a second insulating layer filling a space over the first insulating layer to the same level as a top surface of the first magnetic layer.

3. A thin film magnetic head according to claim 2, wherein the length from the forefront end of the first insulating layer to the forefront end of the first thin film coil pattern is equal to or more than the thickness of the first thin film coil pattern.

4. A thin film magnetic head according to claim 2, wherein the first insulating layer is formed of an organic insulating material and the second insulating layer is formed of an inorganic insulating material.

5. A thin film magnetic head according to claim 1, wherein the conductive layer pattern is a wiring pattern for providing the first thin film coil pattern with a current, the conductive layer pattern being formed of the same material as that of the second magnetic layer through the same step as that of forming the second magnetic layer.

6. A thin film magnetic head according to claim 1, wherein the thin film coil further includes a second thin film coil pattern provided between the first thin film pattern and the one of the two magnetic layers with part of the insulating layer in between.

7. A thin film magnetic head according to claim 6, wherein the conductive layer pattern is a third connection pattern which is integrated into one body with the second thin film coil pattern and is provided in the end of the second thin film coil pattern.

8. A thin film magnetic head according to claim 6, wherein the insulating layer further includes a third insulating layer which covers the second thin film coil pattern and the conductive layer pattern.

9. A thin film magnetic head according to claim 8, wherein the surface of the first insulating layer on the recording-medium-facing surface side is given a slope towards the surface of the gap layer; and an angle of the slope lies within the range of 5° and 45°.

10. A thin film magnetic head according to claim 8, wherein the third insulating layer is formed of an organic insulating material.

* * * * *